(12) United States Patent
Lee

(10) Patent No.: US 8,111,509 B2
(45) Date of Patent: Feb. 7, 2012

(54) RACK BODY WITH ENGAGING MECHANISM

(75) Inventor: Tung-Ping Lee, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 230 days.

(21) Appl. No.: 12/207,784

(22) Filed: Sep. 10, 2008

(65) Prior Publication Data

US 2010/0170860 A1  Jul. 8, 2010

(30) Foreign Application Priority Data

Sep. 12, 2007  (TW) .............................. 96215336 U

(51) Int. Cl.
*H05K 7/00*  (2006.01)
(52) U.S. Cl. ..................................... 361/679.33; 211/26
(58) Field of Classification Search .................. 211/26, 211/26.2; 361/679.33, 679.37, 679.38, 679.39
See application file for complete search history.

(56) References Cited

U.S. PATENT DOCUMENTS

| | | | | |
|---|---|---|---|---|
| 5,721,669 A * | 2/1998 | Becker et al. | ............ | 361/679.31 |
| 6,088,221 A * | 7/2000 | Bolognia | ................. | 361/679.37 |
| 6,373,696 B1 * | 4/2002 | Bolognia et al. | ......... | 361/679.47 |
| 6,819,555 B2 * | 11/2004 | Bolognia et al. | ......... | 361/679.33 |
| 7,180,733 B2 * | 2/2007 | Chang | ...................... | 361/679.33 |
| 7,551,433 B2 * | 6/2009 | Hammer et al. | ......... | 361/679.33 |
| 7,639,492 B2 * | 12/2009 | Thomas et al. | .......... | 361/679.37 |
| 7,697,276 B2 * | 4/2010 | Peng et al. | ................ | 361/679.33 |
| 7,697,278 B2 * | 4/2010 | Peng et al. | ................ | 361/679.35 |
| 7,903,401 B2 * | 3/2011 | Lee et al. | .................. | 361/679.33 |

* cited by examiner

*Primary Examiner* — Darnell Jayne
*Assistant Examiner* — Stanton L Krycinski

(57) ABSTRACT

Disconnected slits are disposed between one end of at least one of the first and the second side plates coupled to a retaining pin and a bottom plate of a rack body with an engaging mechanism to form a free end thereby allowing an operation of an insertion of the retaining pin into or a separation thereof from the screw hole to be more convenient by offsetting the free end outward to lengthen a distance between the two opposite retaining pins.

18 Claims, 5 Drawing Sheets

1 …

RACK BODY WITH ENGAGING MECHANISM

BACKGROUND OF THE INVENTION

1. Field of the Invention

The present invention relates to a portable removable rack of an electronic device, and more particularly to a mechanism for coupling a rack body of a portable removable rack to an electronic device.

2. Description of Related Art

There are many patents concerning a hard disk removable rack, for example, a hard disc removable rack disclosed in Taiwan patent publishing No. 534439 comprises a parent rack and a subsidiary rack, upper and lower side faces of the parent rack are hollow, a front side thereof is provided with a shielding plate capable of swinging inward and a rear side thereof is locked to a circuit board with a terminal. Furthermore, a front side of the subsidiary rack is provided with a fan and a rear side thereof is provided with another circuit board, in which a front side of the circuit board is provided with a bus line terminal and a power connection, and a rear side thereof is provided with another terminal to allow the two terminals to be inserted into each other when the subsidiary rack is inserted in the parent rack and the bus line terminal together with the power connection to be used for an insertion use when the hard disk main body is positioned inside the subsidiary rack. Besides, one side of the hard disk main body is reserved with screw holes and one side of the subsidiary rack is correspondingly disposed with through holes so as to allow the hard disk main body to be fixed by utilizing bolts to pass through to do screw connections to fix the hard disk main body.

An operation of the screw locking or the hard disk detaching is very labor wasting such that the assembly cost is increased.

SUMMARY OF THE INVENTION

For allowing an electronic device to be coupled to or detached from a portable removable rack, the present invention is proposed.

The main object of the present invention is to provide a rack body with an engaging mechanism, allowing an article such as an electronic device to be separated from or retained in a rack body more easily and fast by means of a simple detachment or assembly operation.

Another object of the present invention is to provide a rack body with an engaging mechanism, allowing an article to be assembled in the rack body fast and conveniently so as to elevate an assembly operation of the article and the rack body, elevate the production efficiency and decrease the assembly cost.

A rack body with an engaging mechanism according to the present invention comprising:
a main body, disposed with a bottom plate, a front plate, a fist side plate and a second side plate to form a accepting seat for the article; the first and the second side plates being respectively positioned at first and second sides of the accepting seat;
a plurality of retaining pins, respectively coupled to the first and the second side plates, projected out toward an inside of the main body and used for inserting in corresponding screw holes on the article;
wherein disconnected slits are disposed between one end of at least one of the first and the second side plates coupled to the retaining pins and the bottom plate to form free ends thereby allowing an operation of an insertion of the retaining pin into or a separation thereof from the screw hole to be more convenient by offsetting the free end outward to lengthen a distance between the two opposite retaining pins.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
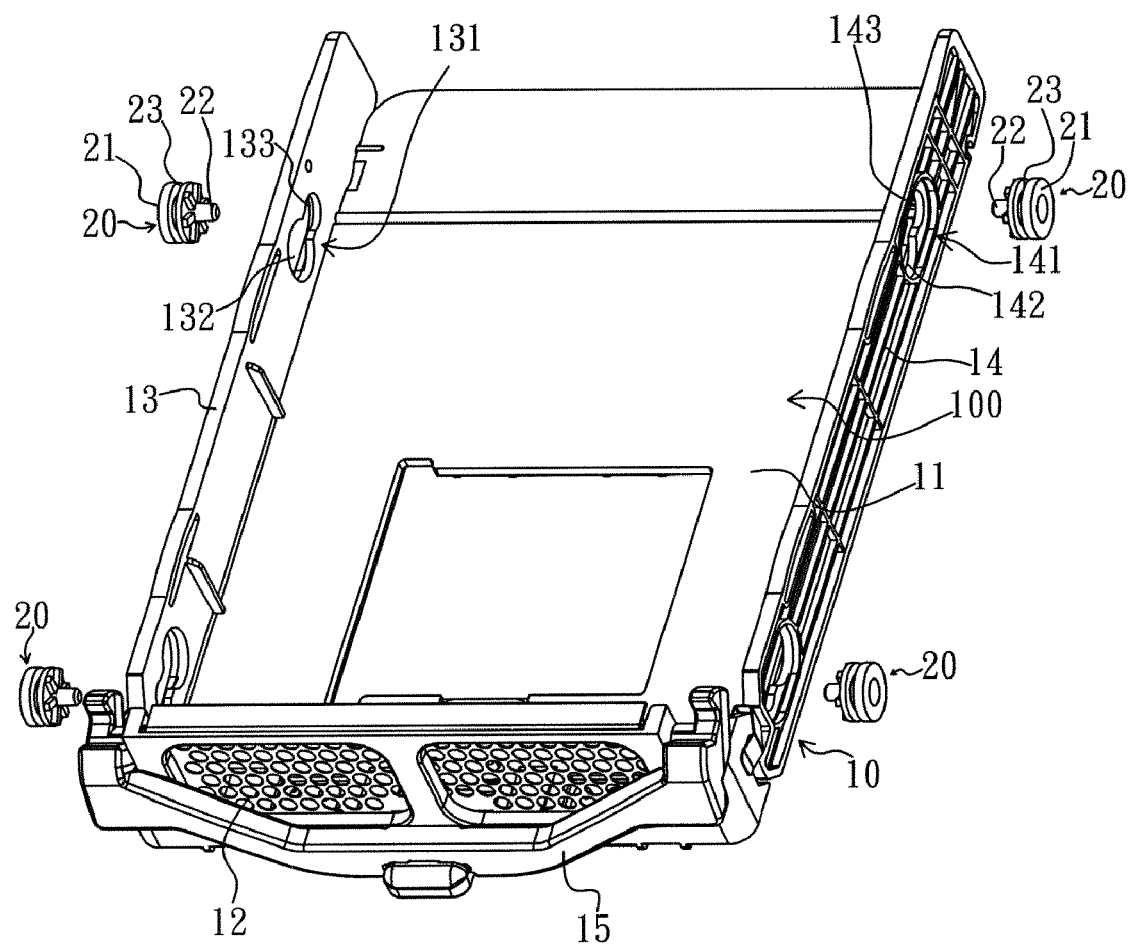
FIG. 1 is a perspective view, showing a main body of the present invention while being not coupled to retaining pins.

Please refer to FIG. 1. A rack body with an engaging mechanism of the present invention comprises a main body 10 and four retaining pins 20 coupled thereto.

The main body 10 comprises a bottom plate 11, a front plate 12, a first side plate 13, a second side plate 14 and a handle 15, in which the front plate 12, the first side plate 13 and the second side plate 14 are respectively coupled to a front edge, a first side edge and a second side edge of the bottom plate 11 to form an accepting seat 100; two ends of the handle 15 are respectively pivotally coupled to two ends of the front plate 12; the first and the second side plates 13 and 14 are respectively disposed with two retaining holes 131 and 141; the retaining holes 131, 141 are respectively provided with first hole diameter sections 132, 142 as well as second diameter sections 133, 143; open holes of the first hole diameter sections 132, 142 are larger than open holes of the second hole diameter sections 133, 143.

Figure 3:
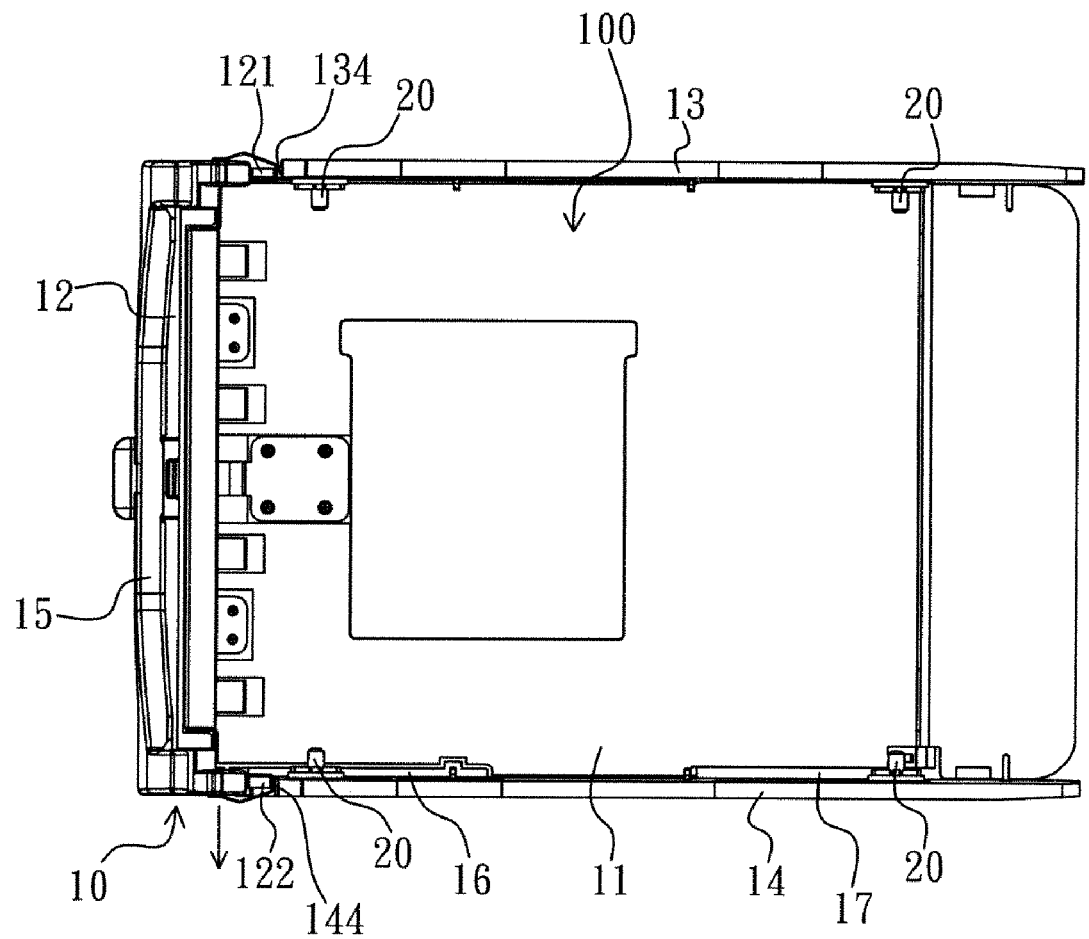
FIG. 3 is a top view, showing a main body of the present invention while being coupled to retaining pins.

Please refer to FIG. 3. Two long slits 16, 17 are disposed between the bottom plate 11 and the second side plate 14 and extend from the front and rear ends of the second side plate respectively to allow two ends of the second side plate 14 can be bended outward freely to increase a distance between the retaining pin 20 of the first side plate 13 and the corresponding retaining pin 20 of the second side plate 14.

The present invention also allows front and rear ends of the bottom plate 11 and the first side plate 13 to be respectively disposed with disconnected long slits to enable the front and rear ends of the first side plate 13 to be formed with free ends and provided with a function of being capable of being bended outward as the front and the rear ends of the bottom plate 11 and the second side plate 14 are done mentioned above. The front and the rear ends of the first side plate 13 and the second side plate 14 can be respectively bended outward to increase a distance between the retaining pin 20 of the first side plate 13 and the corresponding retaining pin 20 of the second side plate 14.

Figure 4:
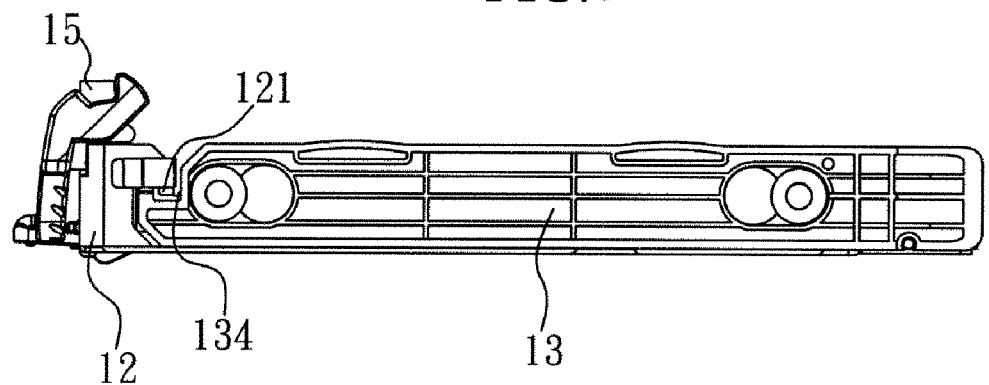
FIG. 4 is a side view of a rack body of the present invention.

Please refer to FIGS. 3 and 4. Upper edges of the front end of the two side plates 13, 14 are respectively disposed with grooves 134, 144; upper ends of two ends of the front plate 12 are respectively disposed with buckling tabs 121, 122 corresponding to the grooves 134, 144; the buckling tabs 121, 122 are respectively buckled in the grooves 134, 144. When the handle 15 exerts a force on the front plate 12 to move it forward, a upper end of the front plate 12 is allowed not to incline forward due to a pull force of the handle 15 by buckling the buckling tabs 121, 122 into the grooves 134, 144.

Figure 2:
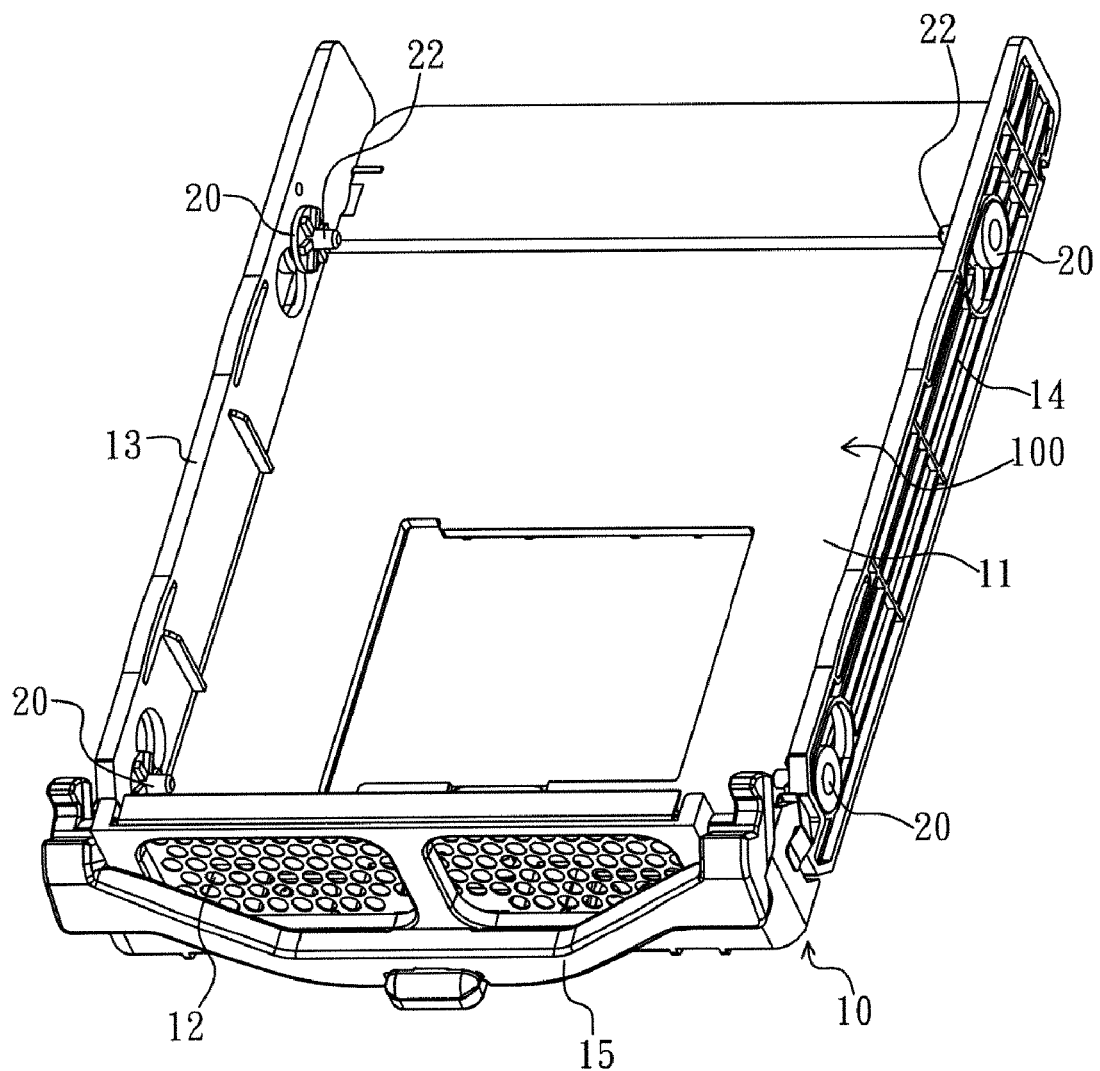
FIG. 2 is a perspective view, showing a main body of the present invention while being coupled to retaining pins.

Please refer to FIGS. 1 and 2. The retaining pin 20 is disposed with a cap portion 21 and an insertion portion 22, in which the cap portion 21 is disposed with a circular groove 23. The cap portions 21 of the two retaining pins 20 are first respectively placed in the first hole diameter section 132, 142 of the retaining holes 131, 141, and moved toward the second hole diameter sections 133, 143 to allow the circular grooves 23 thereof to be respectively buckled into the second hole diameter sections 133, 143. Thereafter, the retaining pins 20 are respectively coupled to the first and the second side plate 13, 14, and the insertion portions 22 are projected out toward the insides of the first and the second side plates 13, 14 to enable them to be inserted into screw holes of an electronic device to fix the electronic device, as an example, inserted into corresponding screw holes of a hard disk to fix the hard disk.

The present invention also allows the first and the second side plates 13, 14 to be respectively integrated with the retaining pins 20, and then the retaining holes 131, 141, the cap portion 21, the circular groove 23 and etc are unnecessarily disposed.

Figure 5:
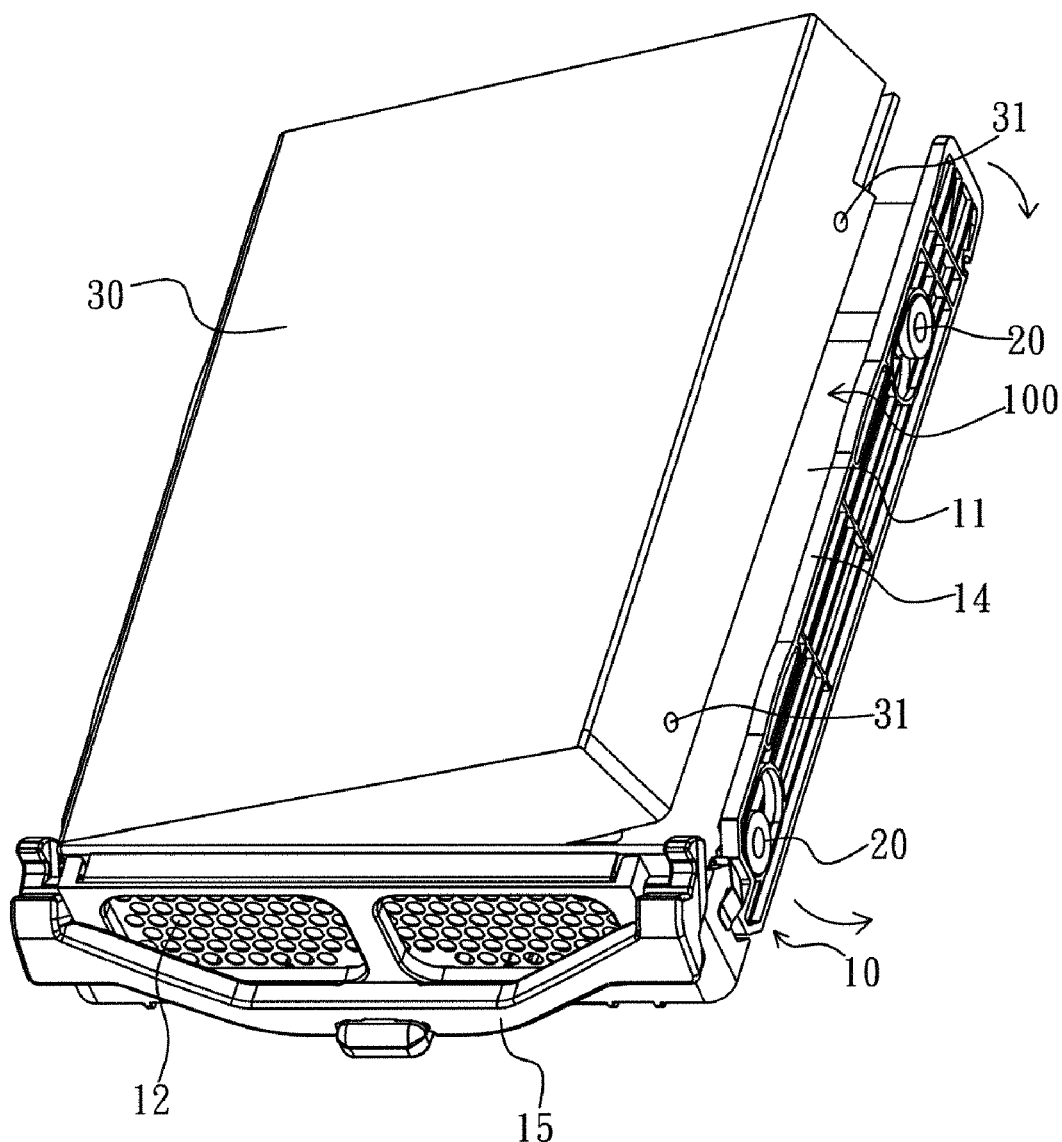
FIG. 5 is a perspective view, showing a rack body of the present invention in the middle of a hard disk placement.
Figure 6:
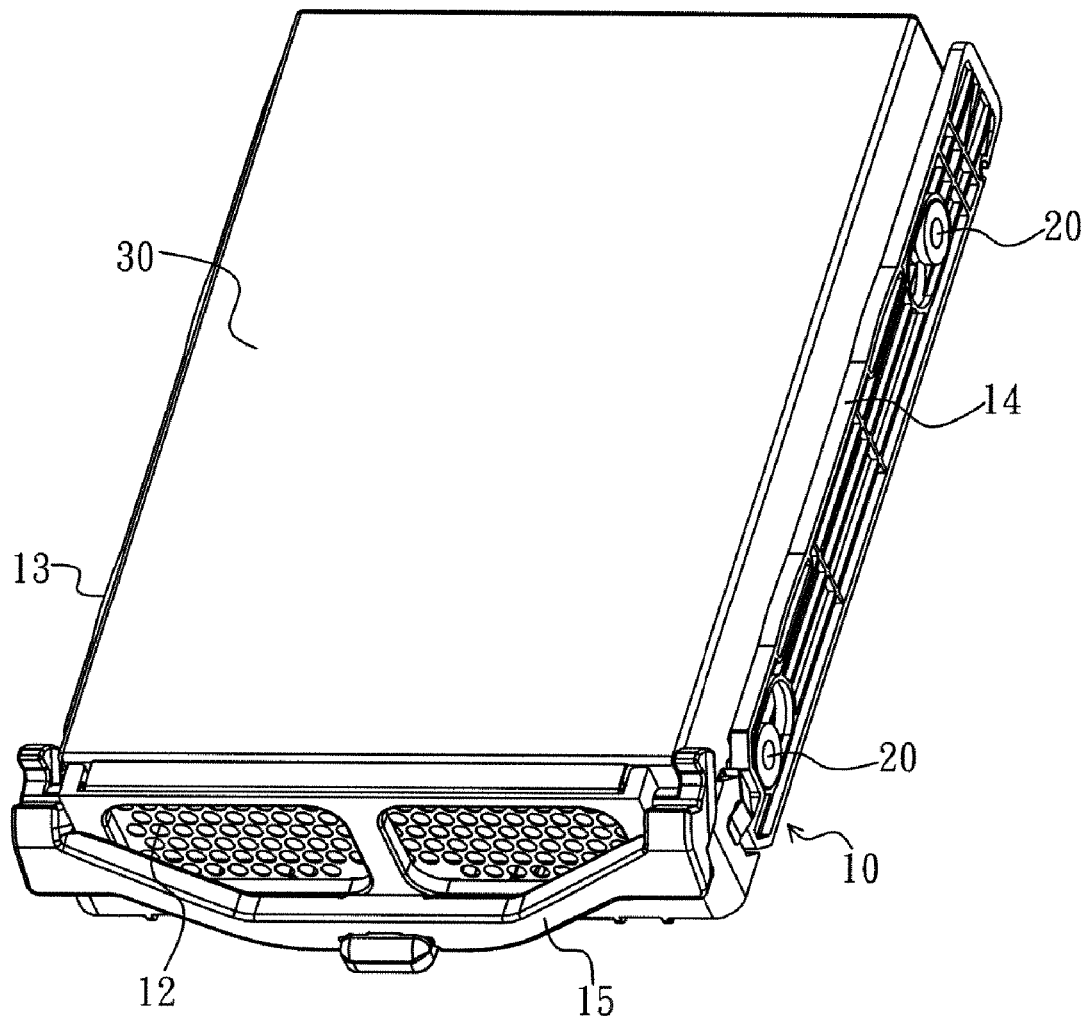
FIG. 6 is a perspective view, showing a rack body of the present invention after a hard disk is placed thereon.

Please refer to FIGS. 1, 5 and 6. When a hard disk 30 is caused to assemble onto the main body 10 of the present invention, the insertion portion 22 of the retaining pin 20 of the first side plate 13 of the main body 10 is first allowed to insert into a corresponding screw hole 31 of a first side of the hard disk 30 as shown in FIG. 5. And then, the front and the rear ends of the second side plate 14 are bended outward to cause the retaining pin 20 coupled to the second side plate 14 to be moved outward to increase a distance between it and the retaining pin 20 of the first side plate 13. Thereafter, a second side of the hard disk 30 is allowed to place into the main body 10, and the insertion portion 22 of the retaining pin 20 of the second side plate 14 is then caused to insert into a corresponding screw hole 31 on the second side of the hard disk 30. Finally, the hard disk 30 is allowed to fix in the main body 10 as shown in FIG. 6.

The long slits 16, 17 are disposed to allow the front and rear ends of at least one of the first and the second side plates 13, 14 of the main body 10 to disconnect from the bottom plate 11 such that the retaining pin 20 being inserted or separated from the screw hole 31 of the hard disk 30 can be operated more conveniently by bending the two free ends of the corresponding side plate outward to widen a distance between the two corresponding retaining pins 20 on the first and second side plates 13, 14.

An article is allowed to separate from or fix on a rack body easily and fast by means of a simple detachment or assembly operation according to the present invention to enable the article to be assembled in the rack body fast and conveniently thereby speeding the assembly operation of the article and the rack body, elevating the production efficiency and decreasing the assembly cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rack body with an engaging mechanism comprising:
a main body having a bottom plate, a front plate, a first side plate, and a second side plate, wherein the bottom plate has a front edge, a first side edge, and a second side edge; the front plate, the first side plate, and the second side plate are coupled to the first edge, the first side edge, and the second side edge respectively to form an accepting seat for accepting an article which provides screw holes at two opposite sides thereof; and
a plurality or retaining pins respectively coupled to said first and said second side plates, projecting out toward the accepting seat, being disposed opposite to each other corresponding to the screw holes of said article, and engaging with the screw holes;
wherein the first and second side plates each have a front end and a rear end, the main body further comprises a long slit disposed at and extending along one of the first and side lateral edges of the bottom plate and from the front and rear ends of said one of the two side plates to result in said front and rear ends disconnecting from said one of the two side plates respectively such that when the disconnected front and rear ends are bent outward to widen a respective distance between the retaining pins on said two side plates, the retaining pins on said one of the two side plates are capable of engaging with or disengaging from the screw holes corresponding to said retaining pins.

2. The rack body with an engaging mechanism according to claim 1, wherein the long slit respectively extends from the front and rear ends of said second side plate to allow said front and rear ends of said second side plate to form a free end respectively.

3. The rack body with an engaging mechanism according to claim 2, wherein the respective front end of said first and said second side plates has an upper edge disposed with a groove; said front plate has a rear side disposed with a buckling tab corresponding to said groove; said buckling tab is buckled into said groove.

4. The rack body with an engaging mechanism according to claim 1, wherein said first and second side plates are respectively disposed with at least one retaining hole for fixing one of said retaining pins.

5. The rack body with an engaging mechanism according to claim 4, wherein said retaining hole is provided with a first hole diameter section and a second hole diameter section; each of said retaining pins is provided with a cap portion and an insertion portion; said cap portion has a groove engaged with said second diameter section of said retaining hole.

6. The rack body with an engaging mechanism according to claim 5, wherein said first and second side plates are respectively coupled to two of said retaining pins.

7. The rack body with an engaging mechanism according to claim 1, wherein said first and second side plates are respectively integrated with said retaining pins.

8. The rack body with an engaging mechanism according to claim 7, wherein said first and second side plates are respectively disposed with two of said retaining pins.

9. The rack body with an engaging mechanism according to claim 2, wherein said first side and said second side plates are respectively disposed with at least one retaining hole for fixing said retaining pins.

10. The rack body with an engaging mechanism according to claim 9, wherein said retaining hole is provided with a first hole diameter section and a second hole diameter section; each of said retaining pins is provided with a cap portion and an insertion portion; said cap portion has a groove engaged with said second diameter section of said retaining hole.

11. The rack body with an engaging mechanism according to claim 10, wherein said first and second side plates are respectively coupled to two of said retaining pins.

12. The rack body with an engaging mechanism according to claim 3, wherein said first and second side plates are respectively disposed with at least one retaining hole for fixing one of said retaining pins.

13. The rack body with an engaging mechanism according to claim 12, wherein said retaining hole is provided with a first hole diameter section and a second hole diameter section; each of said retaining pin is provided with a cap portion and an insertion portion; said cap portion has a groove engaged with said second diameter section of said retaining hole.

14. The rack body with an engaging mechanism according to claim 13, wherein said first and second side plates are respectively coupled to two of said retaining pins.

15. The rack body with an engaging mechanism according to claim 2, wherein said first and second side plates are respectively integrated with said retaining pins.

16. The rack body with an engaging mechanism according to claim 15, wherein said first and second side plates are respectively disposed with two of said retaining pins.

17. The rack body with an engaging mechanism according to claim 3, wherein said first and second side plates are respectively integrated with said retaining pins.

18. The rack body with an engaging mechanism according to claim 17, wherein said first and second side plates are respectively disposed with two of said retaining pins.

* * * * *